(12) United States Patent
Hinhnay

(10) Patent No.: US 11,584,338 B1
(45) Date of Patent: Feb. 21, 2023

(54) AUTOMOTIVE SAFETY BRAKE SYSTEM

(71) Applicant: Henry Hinhnay, Chicago, IL (US)

(72) Inventor: Henry Hinhnay, Chicago, IL (US)

( * ) Notice: Subject to any disclaimer, the term of this patent is extended or adjusted under 35 U.S.C. 154(b) by 176 days.

(21) Appl. No.: 17/248,762

(22) Filed: Feb. 5, 2021

Related U.S. Application Data

(60) Provisional application No. 62/972,273, filed on Feb. 10, 2020.

(51) Int. Cl.
*B60T 1/14* (2006.01)
*B62L 1/00* (2006.01)

(52) U.S. Cl.
CPC . *B60T 1/14* (2013.01); *B62L 1/00* (2013.01)

(58) Field of Classification Search
CPC ...... B62L 1/00; B60T 1/14; B60T 3/00; B64F 1/16
USPC ........................................ 188/5, 36
See application file for complete search history.

(56) References Cited

U.S. PATENT DOCUMENTS

| | | | | |
|---|---|---|---|---|
| 1,581,079 A | * | 4/1926 | Pollifrone | B60T 1/14 188/5 |
| 1,762,997 A | * | 6/1930 | Lightford | B60T 1/14 188/4 R |
| 2,097,329 A | * | 10/1937 | Karl | B60T 1/14 188/4 R |
| 2,437,108 A | * | 3/1948 | Madison | B64F 1/16 244/101 |
| 2,806,556 A | * | 9/1957 | Norris | B60T 1/14 188/4 R |
| 5,881,846 A | * | 3/1999 | French | B62B 5/0423 188/111 |
| 6,125,972 A | * | 10/2000 | French | B62B 5/0423 188/111 |
| 2013/0306411 A1 | * | 11/2013 | Hussain | B62B 5/0442 188/19 |

FOREIGN PATENT DOCUMENTS

| | | | | |
|---|---|---|---|---|
| DE | 1655131 A1 | * | 6/1971 | |
| RU | 177068 U1 | * | 2/2018 | |
| WO | WO-9513953 A1 | * | 5/1995 | ............. B60R 25/09 |

* cited by examiner

*Primary Examiner* — Melanie Torres Williams
(74) *Attorney, Agent, or Firm* — Dunlap Bennett & Ludwig, PLLC

(57) ABSTRACT

A safety brake system is provided. The safety brake system includes a frame configured to be mounted to a vehicle above a vehicles tire; at least one sliding arm slidably coupled to the frame; and at least one actuator, wherein the actuator deploys the sliding arm to extend out of the frame and engage a driving surface in a braking position, and the actuator retracts the sliding arm to retract back within the frame in a driving position.

4 Claims, 10 Drawing Sheets

AUTOMOTIVE SAFETY BRAKE SYSTEM

CROSS-REFERENCE TO RELATED APPLICATION

This application claims the benefit of priority of U.S. provisional application No. 62/972,273 filed 10 Feb. 2020, the contents of which are herein incorporated by reference.

BACKGROUND OF THE INVENTION

The present invention relates to brakes and, more particularly, to a safety brake system of automotive.

Vehicles that are parked may still roll due to a faulty system. Additionally, manual vehicles that are not engaged in a gear may roll while in park due to faulty brakes.

As can be seen, there is a need for an improved, independent automotive brake safety system able to tie into the automotive brake system using the vehicle's sensor system, enabling the driver to safely make an emergency stop.

SUMMARY OF THE INVENTION

In one aspect of the present invention, a safety brake system includes the following: an arcuate frame configured to be mounted to a vehicle above a wheel of said vehicle; at least one sliding arm slidably coupled to the arcuate frame; and at least one actuator, wherein the at least one actuator deploys each sliding arm to extend out of the arcuate frame and engage a driving surface, and the at least one actuator retracts each sliding arm to retract back within the arcuate frame.

In another aspect of the present invention, the safety brake system further includes wherein the arcuate frame circumscribes at least an upper semicircle of the wheel, wherein the sliding arm contacts the driving surface forward or rearward of the wheel in the deployed position; a plurality of teeth extend from a distal end of each sliding arm; a lower frame track along a lower interior surface of the arcuate frame; and a downward arm track along a downward surface of each sliding plate, wherein the lower frame track and the downward arm track operatively associate; a middle guide channel define by the arcuate frame in which each sliding plate is slidably coupled; at least one slot along through an upper portion of the arcuate frame; and an extension of the actuator connects to the sliding arm through the at least one slot; an upper frame track along an upper interior surface of the arcuate frame; and an upward arm track along an upward surface of each sliding plate, wherein the upper frame track and the upward arm track operatively associate.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a safety brake system including a frame configured to be mounted to a vehicle above a vehicles tire; at least one sliding arm slidably coupled to the frame; and at least one actuator, wherein the actuator deploys the sliding arm to extend out of the frame and engage a driving surface in a braking deployed position, and the actuator retracts the sliding arm to retract back within the frame in a driving retracted position.

Figure 1:
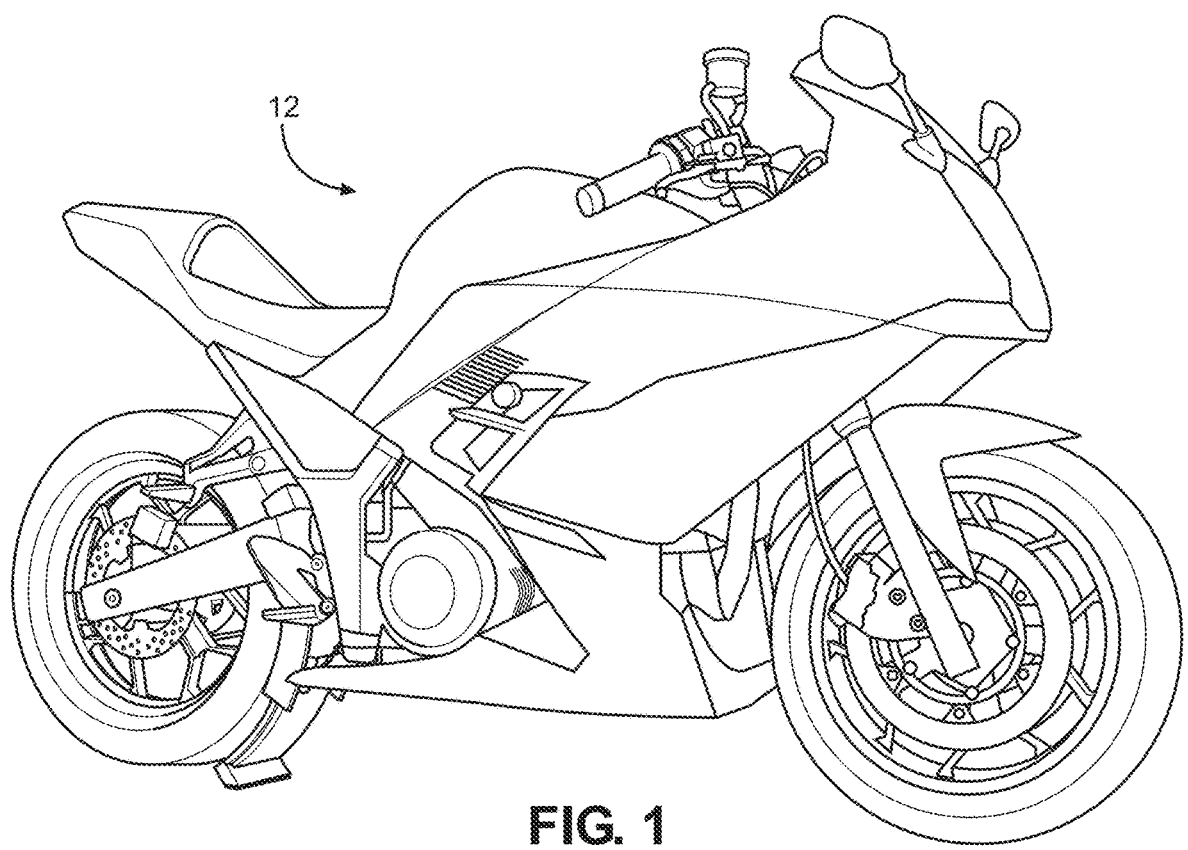
FIG. 1 is a perspective view of a motorcycle.
Figure 2:
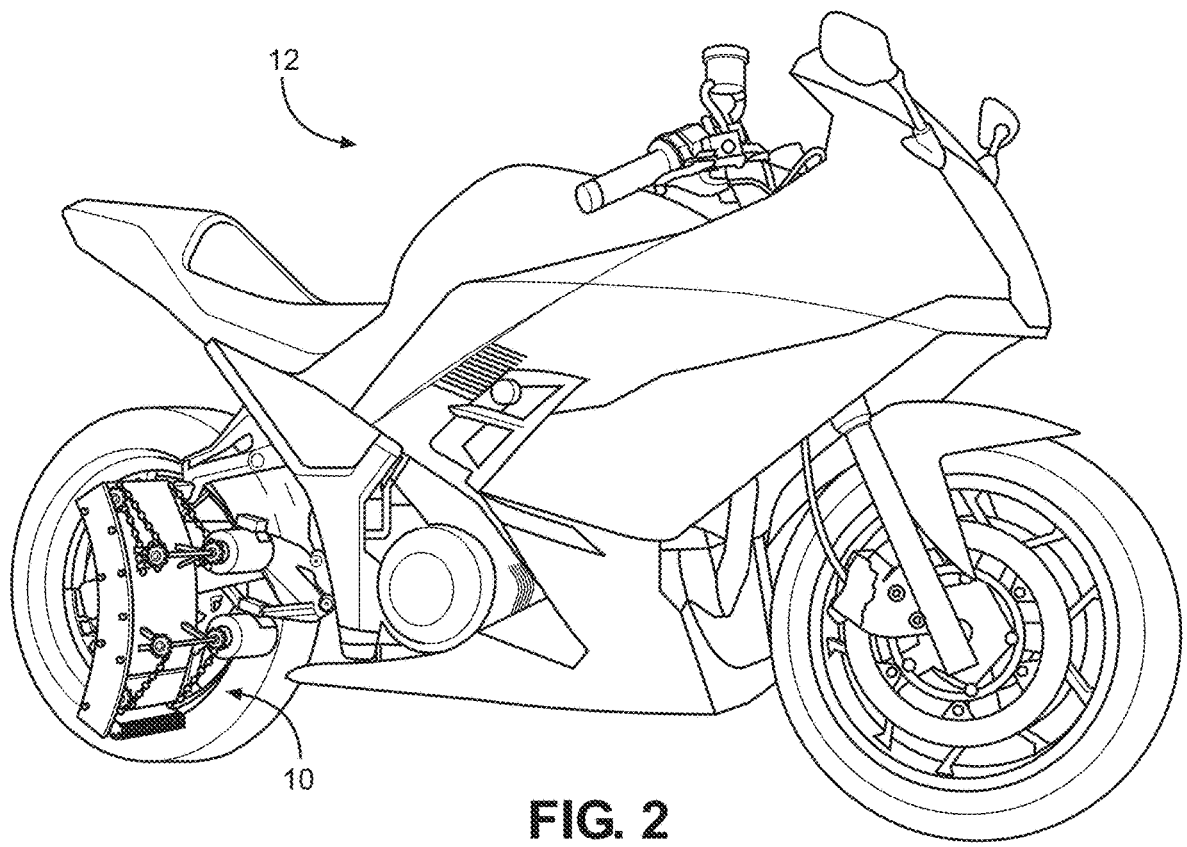
FIG. 2 is a perspective view of a motorcycle embodiment of the present invention, shown in use.
Figure 3:
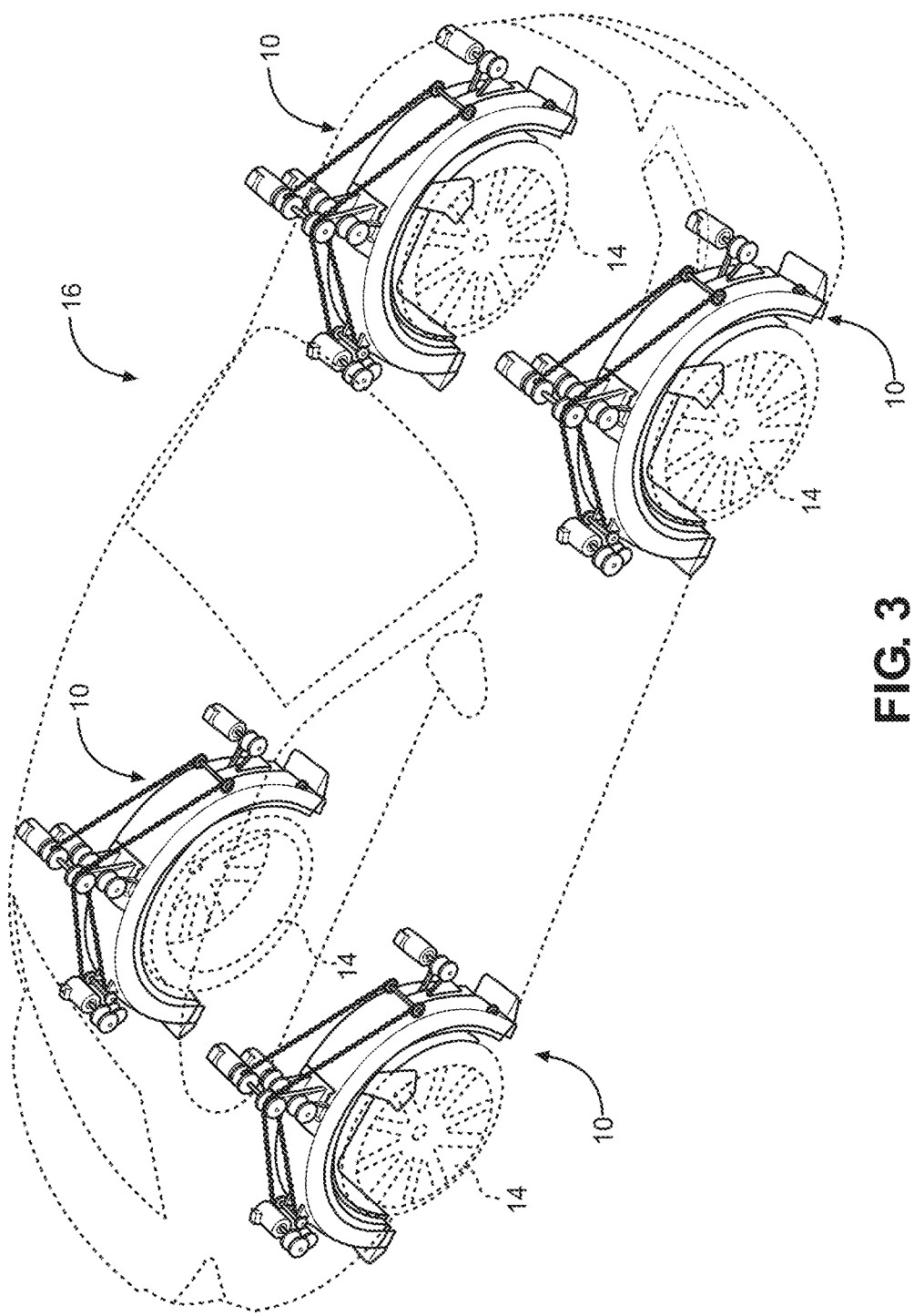
FIG. 3 is a perspective view of the first embodiment of the present invention in use.
Figure 4:
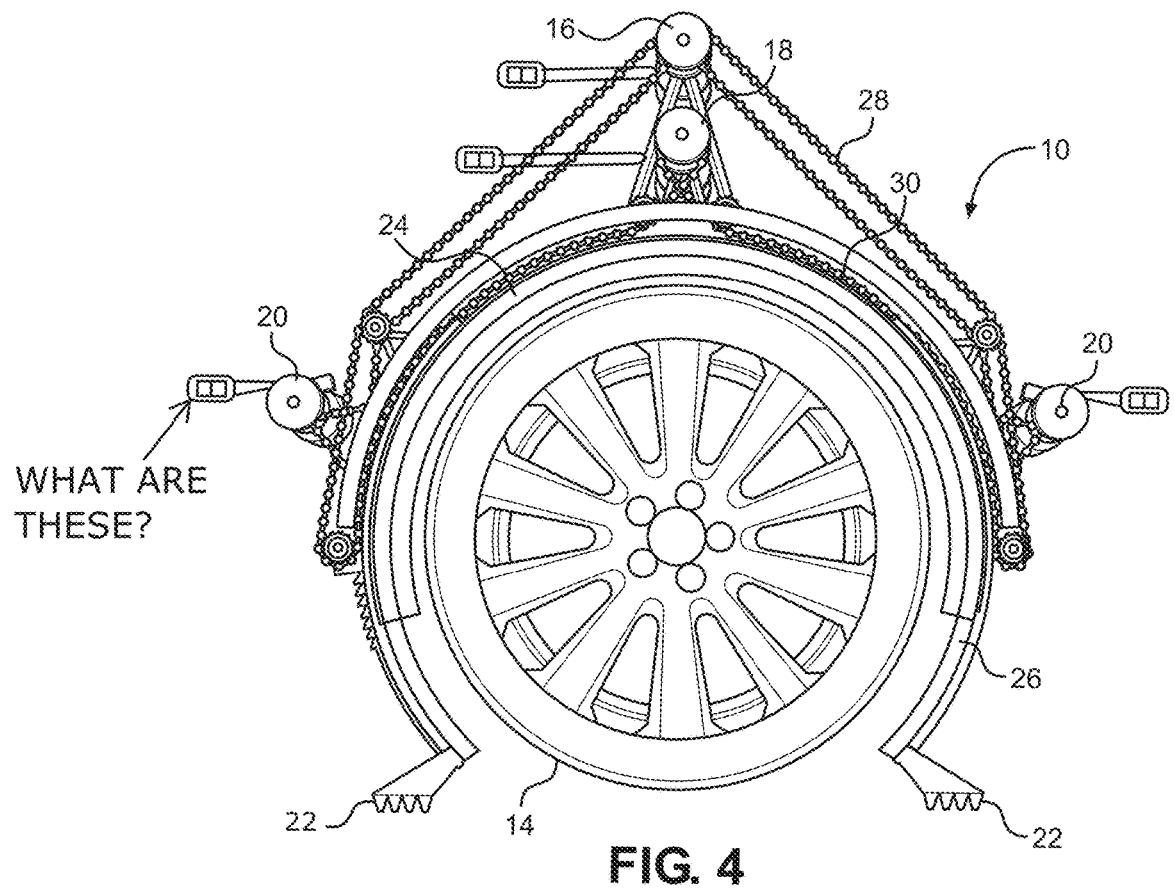
FIG. 4 is a side view of the first embodiment of the present invention in use.
Figure 5:
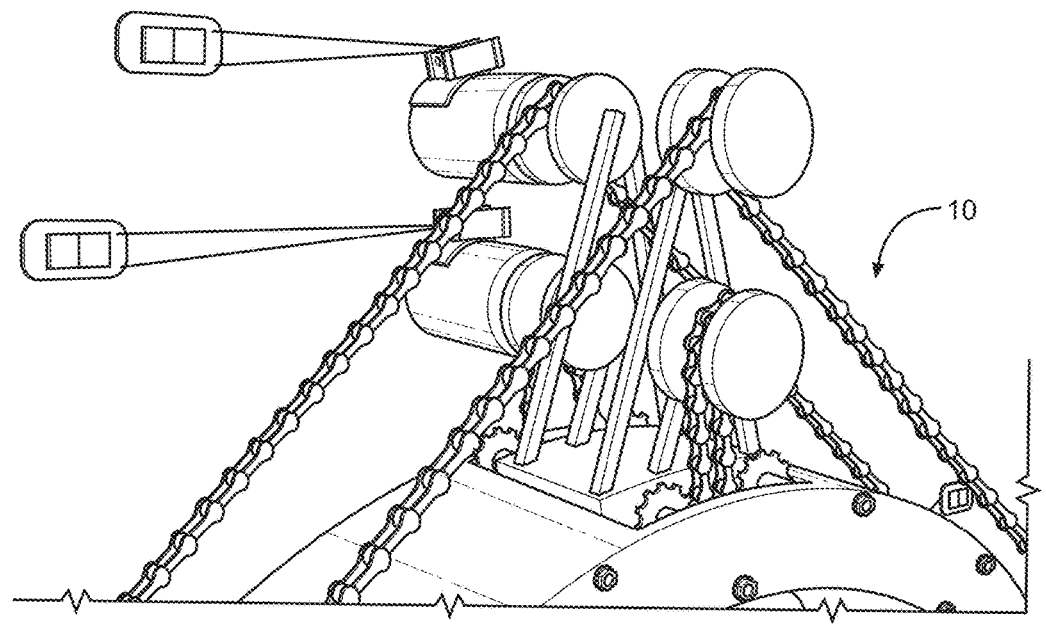
FIG. 5 is detailed perspective view of the first embodiment of the present invention.
Figure 6:
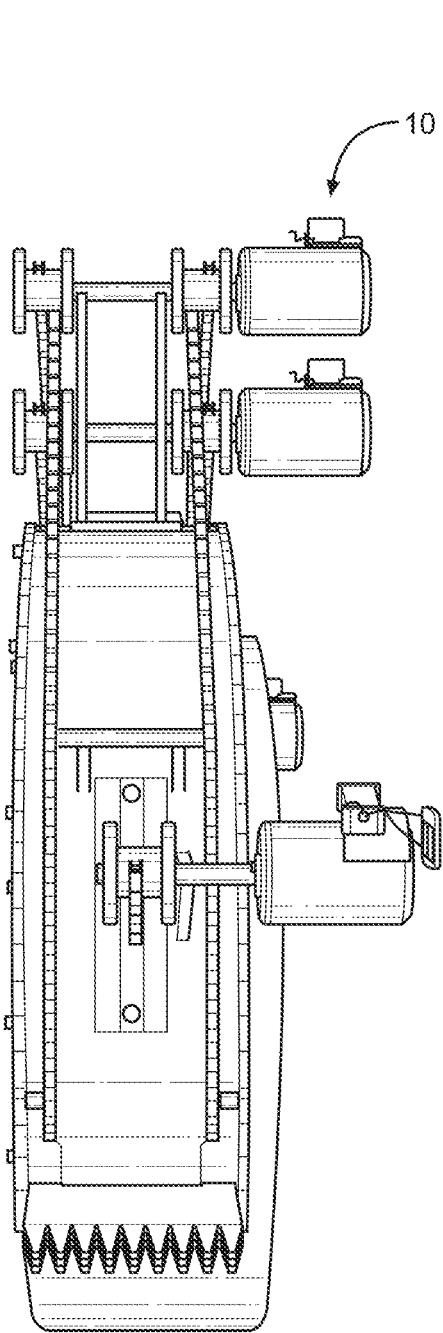
FIG. 6 is a front view of the first embodiment of the present invention.
Figure 7:
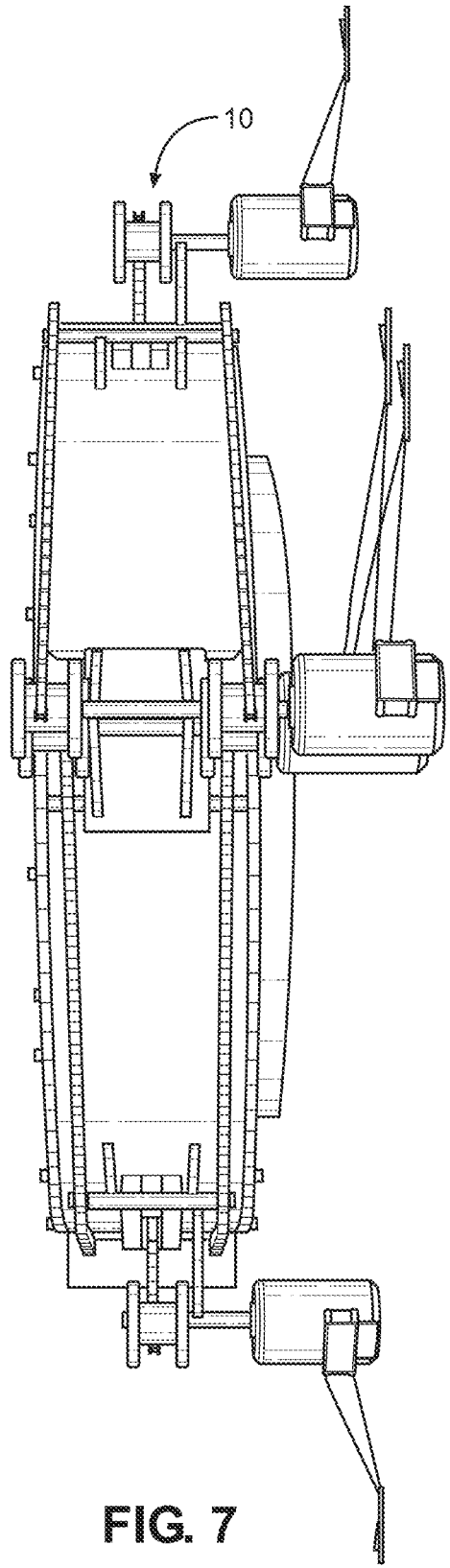
FIG. 7 is a top view of the first embodiment of the present invention.

Referring to FIGS. 1 and 2, the present invention includes a safety brake system 10 usable on a motorcycle. In the motorcycle embodiment the safety brake system 10 may be disposed to the side of the motorcycle wheel when the present invention is in use, unlike when the safety brake system 10 is operatively associated with a four-wheeled vehicle. Though it should be understood that for four-wheeled vehicles, the safety brake system 10 may also be coupled on the side of the wheel.

Referring now to FIGS. 3 through 7, the present invention includes a safety brake system 10. The safety brake system 10 includes a main frame 24 and sliding arms 26 operatively associated thereto. The main frame 24 may be coupled to the vehicle 12 about the vehicle tire 14. The main frame 24 may include an arcuate shape defining a middle guide channel 80 with channel tracks 82 along both the lower and upper interior surfaces of the middle guide channel 80. The sliding arms 26 may provide both lower, downward-facing tracks 50 and upper, upward-facing tracks 52 that slidably couple to the channel tracks 82 of the main frame 24. Actuators 16, 18, 20 may deploy the sliding arms 26 to a braking position in which the sliding arms 26 are extended from the main frame 24 so that the ends of the sliding arms 26 are pressed against the driving surface 90. The actuators 16, 18, 20 may also retract the sliding arms 26 to a driving position in which the sliding arms 26 are retracted within the main frame 24 and away from the driving surface 90.

The actuators 16, 18, 20 may include a first motor 16, a second motor 18, and a third motor 20. In certain embodiments, the present invention may utilize five motors. A first drive chain 28 and a second drive chain 30 are driven about gears by the first motor 16 and second motor 18 respectively. The first motor 16 and the second motor 18 are activated to raise and lower the sliding arms 26. Ends of the sliding arms 26 may include teeth 22 to engage the surface and hold the vehicle 12 in place. For example, the first motor 16 may release the brakes assembly so that the sliding arms 26 deploy and the front and back teeth 22 grab the road. The second motor 16 may retract the braking assembly so that the sliding arms 26 disengage the road once it is safe to drive. The third motor 20 positions and locks the sliding arms 26 in the driving position to keep the brake assembly stationary from sliding back and forth when the vehicle 12 is being driven.

Figure 8:
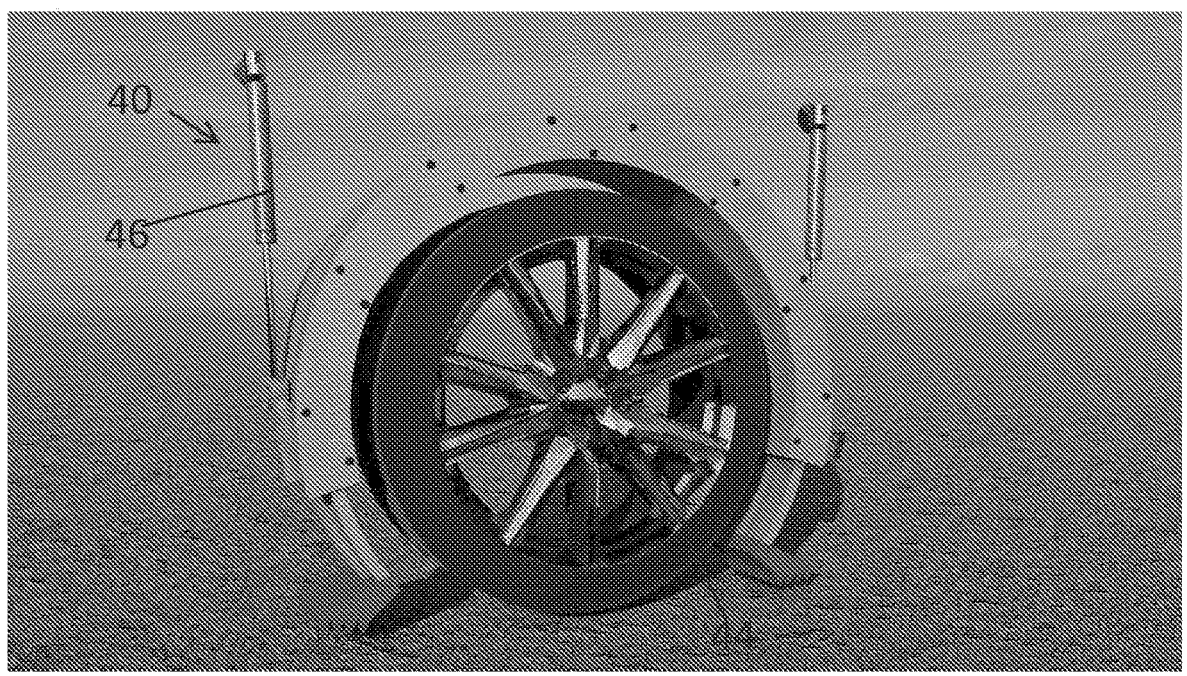
FIG. 8 is a perspective view of a second embodiment of the present invention in a deployed position.
Figure 9:
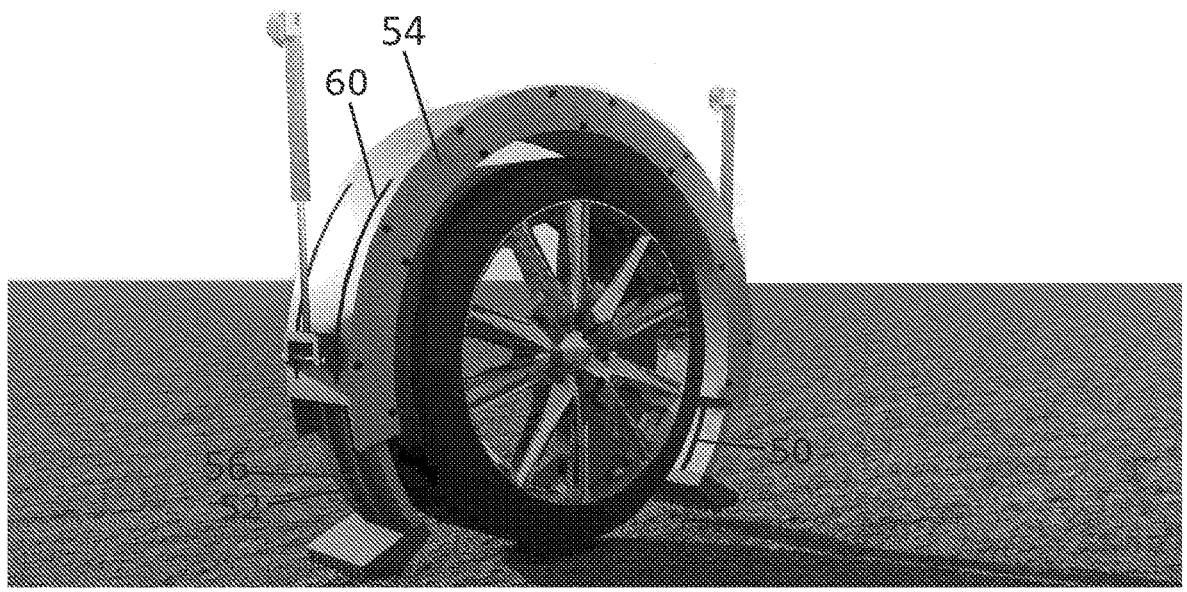
FIG. 9 is a perspective view of the second embodiment of the present invention in the deployed position.
Figure 10:
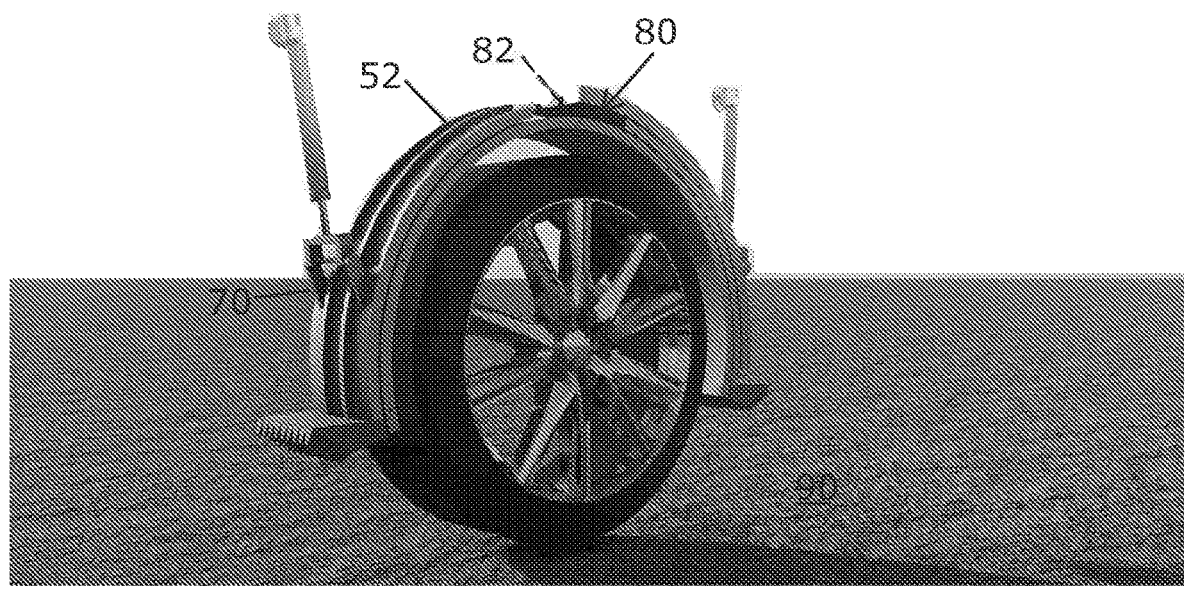
FIG. 10 is a perspective view of the second embodiment of the present invention in a driving retracted position, with an upper portion of the main frame 54 removed for clarity.

Referring now to FIGS. 8 through 10, the present invention includes a safety brake system 40. The safety brake system 40 includes a main frame 54 operatively associated with one or more sliding arms 56. The main frame 54 may be coupled to the vehicle about the vehicle tire 44. The main frame 54 may include an arcuate shape defining a middle guide channel 80 with channel tracks 82 along the upper interior surface and lower interior surface of the guide channel 80, as illustrated in FIG. 10. The sliding arms 56 may provide lower arm tracks 50 and upper arm tracks 52 to operatively associate with the lower and upper channel tracks 82, thereby the sliding arms 56 are slidably coupled to the main frame 54. It being understood that sliding arm 56 and the interior surface of the middle guide channel 80 may only have channel tracks 82 and arm tracks 50/52 on one surface apiece (for instance, channel tracks 82 only one the upper interior surface of the middle guide channel 80 and the sliding arm 56 has only upper arm tracks 52, or vice versa).

Actuators 46 may deploy the sliding arms 56 to a braking position in which the sliding arms 56 are extended from the main frame 54 and ends of the sliding arms 56 are pressed against the driving surface 90. The actuators 46 may also retract the sliding arms 56 to a driving position in which the sliding arms 56 are retracted within the main frame 54 and away from the driving surface 90.

The main frame 54 may provide one or more slots 60 communicating the middle guide channel 80 to the exterior environment. The exterior actuator 46 may have extenders 70 that extend through the slots 60 to connect to the sliding arm 56 (through the main frame 54).

The actuators 46 may include hydraulic cylinders coupled to the frame of the vehicle 12 at one end and coupled to the sliding arms 56 at another end. The hydraulic cylinders may be powered by the battery of the vehicle. A user may activate the hydraulic cylinders by a press of a button. The hydraulic cylinders may deploy the sliding arms 56 by pushing the sliding arms 56 downward along the track 82. The hydraulic cylinders may retract the sliding arms 56 by pulling with upward along the track.

Figure 11:
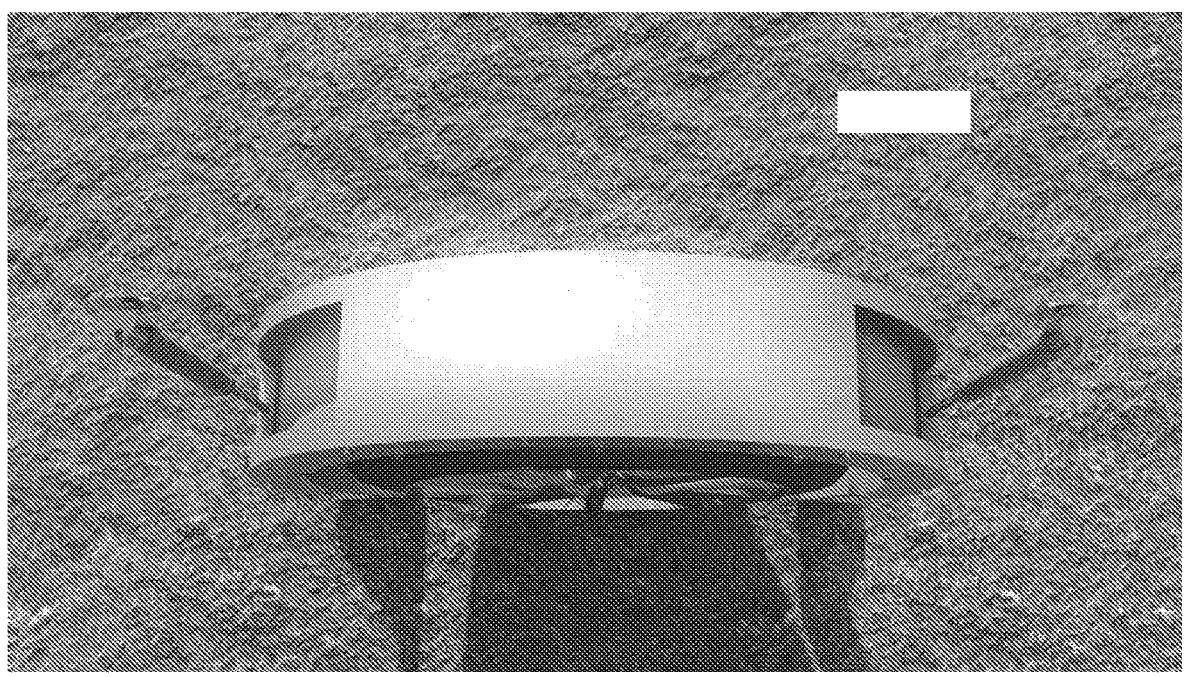
FIG. 11 is a top perspective view of a third embodiment of the present invention in a braking deployed position.
Figure 12:
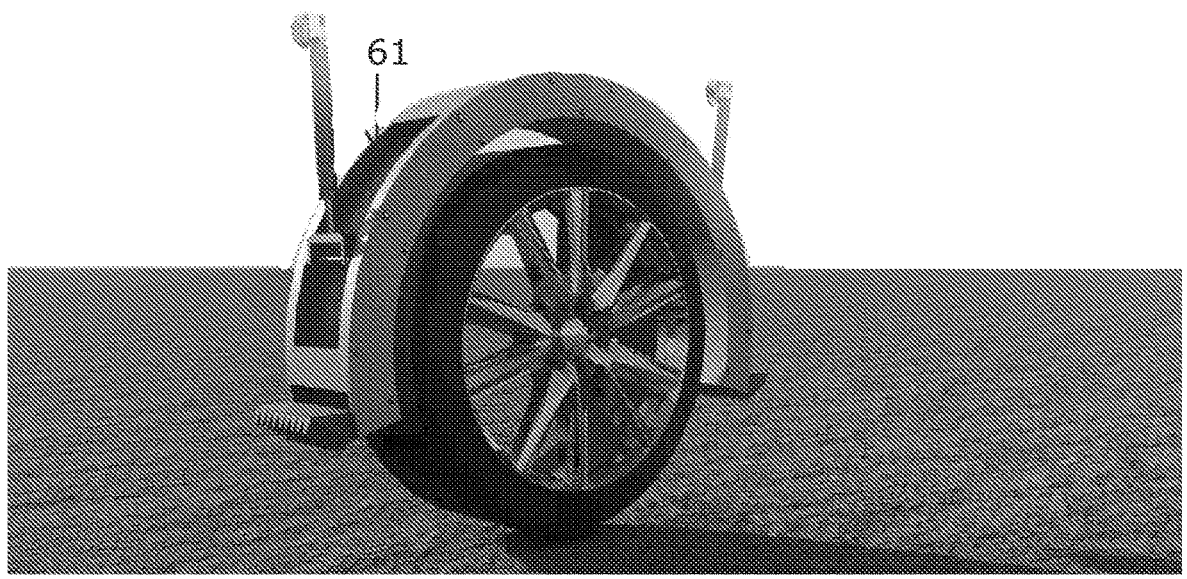
FIG. 12 is a perspective view of the third embodiment of the present invention in a driving retracted position.
Figure 13:
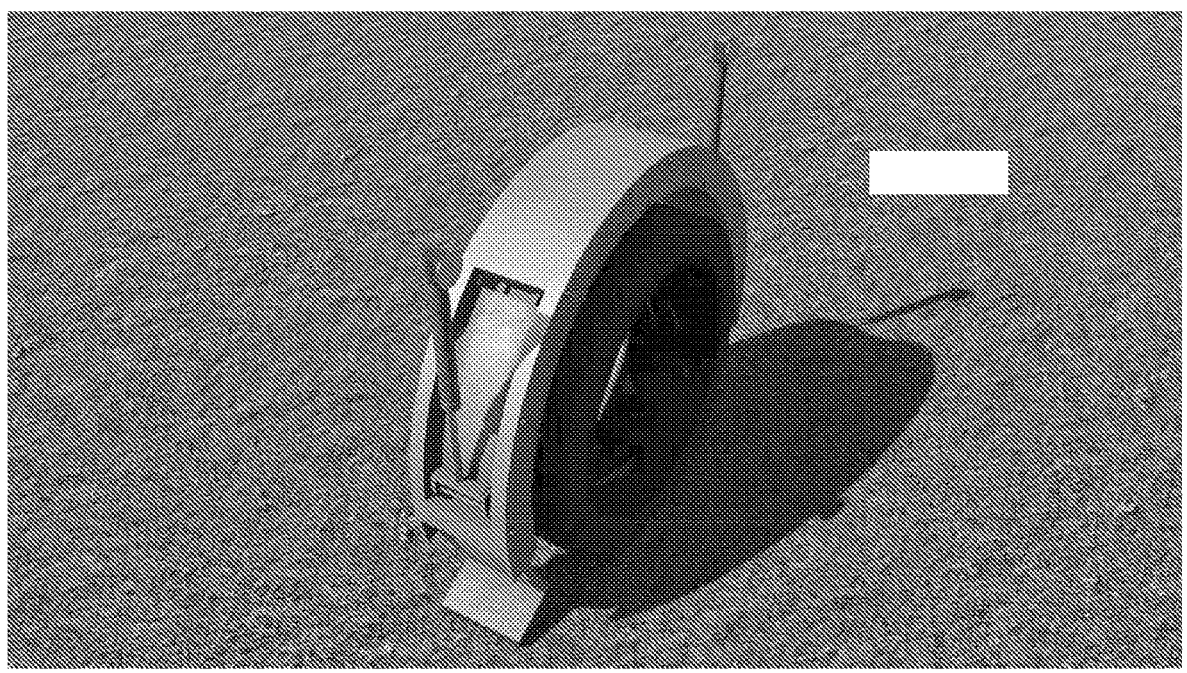
FIG. 13 is a top perspective view of the third embodiment of the present invention in the braking deployed position.

Referring to FIGS. 11-13, instead of slots 60, the main frame 54 may provide a window 61 or opening for the actuator 46 to connect with the sliding arm 56 and be unobstructed while moving between the braking/deployed position and the driving/retracted position.

Figure 14:
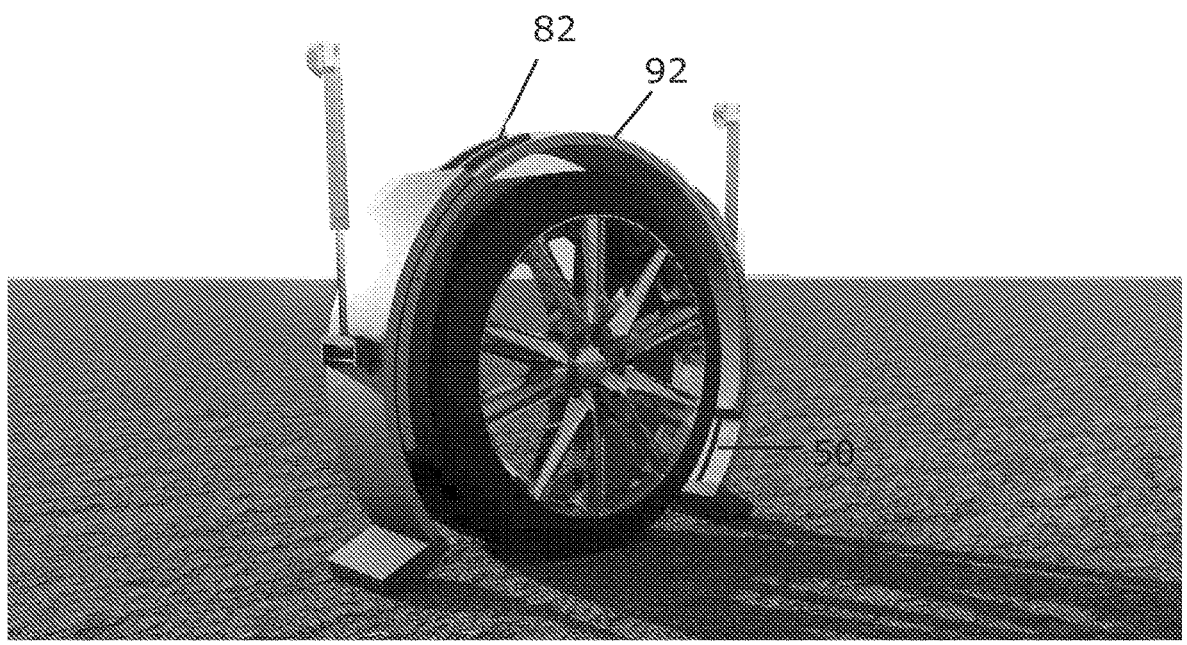
FIG. 14 is a perspective view of a fourth embodiment of the present invention in a braking deployed position.

Referring to FIG. 14, the arcuate main frame 92 may have not define a middle guide channel but instead have only one arcuate shape plate (not two) with upper tracks 82 that operatively associate with the lower arm tracks 50, and thus there would be no need for the slot 60 or the window 61 mentioned above.

It should be understood, of course, that the foregoing relates to exemplary embodiments of the invention and that modifications may be made without departing from the spirit and scope of the invention as set forth in the following claims.

What is claimed is:

1. A safety brake system, comprising:
an arcuate frame configured to be mounted to a vehicle above a wheel of said vehicle;
at least one sliding arm slidably coupled to the arcuate frame;
at least one actuator, wherein the at least one actuator deploys each sliding arm to extend out of the arcuate frame and engage a driving surface, and the at least one actuator retracts each sliding arm to retract back within the arcuate frame, wherein the arcuate frame circumscribes at least an upper semicircle of the wheel, and wherein the sliding arm contacts the driving surface forward or rearward of the wheel in the deployed position;
a plurality of teeth extend from a distal end of each sliding arm; and
a lower frame track along a lower interior surface of the arcuate frame; and a downward arm track along a downward surface of each sliding plate, wherein the lower frame track and the downward arm track operatively associate.

2. The safety brake system of claim 1, further comprising a middle guide channel define by the arcuate frame in which each sliding plate is slidably coupled.

3. The safety brake system of claim 2, further comprising at least one slot along through an upper portion of the arcuate frame; and an extension of the actuator connects to the sliding arm through the at least one slot.

4. The safety brake system of claim 3, further comprising an upper frame track along an upper interior surface of the arcuate frame; and an upward arm track along an upward surface of each sliding plate, wherein the upper frame track and the upward arm track operatively associate.

* * * * *